(12) United States Patent
Kirino et al.

(10) Patent No.: US 8,026,319 B2
(45) Date of Patent: Sep. 27, 2011

(54) DISPERSIBLE SURFACE-MODIFIED CARBON BLACK

(75) Inventors: Tomoaki Kirino, Tokyo (JP); Makoto Sekiyama, Tokyo (JP)

(73) Assignee: Tokai Carbon Co., Ltd., Tokyo (JP)

( * ) Notice: Subject to any disclaimer, the term of this patent is extended or adjusted under 35 U.S.C. 154(b) by 0 days.

(21) Appl. No.: 12/451,170

(22) PCT Filed: May 29, 2007

(86) PCT No.: PCT/JP2007/061248
§ 371 (c)(1),
(2), (4) Date: Oct. 28, 2009

(87) PCT Pub. No.: WO2008/146410
PCT Pub. Date: Dec. 4, 2008

(65) Prior Publication Data
US 2010/0120997 A1    May 13, 2010

(51) Int. Cl.
*C08G 77/16* (2006.01)

(52) U.S. Cl. .......................... 525/474; 528/28

(58) Field of Classification Search ................. 525/474; 528/28
See application file for complete search history.

(56) References Cited

U.S. PATENT DOCUMENTS
2,780,611 A * 2/1957 Te Grotenhuis .............. 523/216
* cited by examiner

*Primary Examiner* — Kuo-Liang Peng
(74) *Attorney, Agent, or Firm* — Flynn, Thiel, Boutell & Tanis, P.C.

(57) ABSTRACT

Dispersible surface-modified carbon black that is surface-modified by causing a functional group on the surface of the carbon black to be bonded to a diol-modified end-containing polymer through a triisocyanate compound exhibits excellent dispersibility in a non-polar solvent, a low-polar solvent, and a resin. The dispersible surface-modified carbon black is characterized in that a surface functional group of the carbon black is bonded to one isocyanate end group of a triisocyanate compound having three isocyanate end groups, and the remaining two isocyanate end groups are respectively bonded to hydroxyl groups of a diol-modified end-containing polymer.

6 Claims, No Drawings

DISPERSIBLE SURFACE-MODIFIED CARBON BLACK

TECHNICAL FIELD

The present invention relates to dispersible surface-modified carbon black that exhibits excellent dispersibility in a non-polar solvent (e.g., silicone oil), a low-polar solvent (e.g., isoparaffin hydrocarbon), a resin, and the like.

BACKGROUND ART

Carbon black has been used as a black pigment. In recent years, a carbon black pigment that is provided with improved dispersibility in water (i.e., polar solvent) via surface modification has been developed as a black coloring material for inkjet printers and the like.

An improvement in dispersibility of carbon black in a non-polar solvent or a low-polar solvent has also been desired. For example, development of dispersible carbon black used for a composition (e.g., ink or paint), a color filter black matrix, a display device, and the like has been desired.

For example, JP-A-8-337624 discloses a carbon black graft polymer that exhibits excellent dispersibility in a medium used for an ink, a copier toner, a paint, a resin coloring agent, and the like, wherein the carbon black graft polymer contains a polymer portion that contains a silicone component and carbon black, and has a breakdown voltage of 0.5 kV/mm or more when dispersed in a silicone oil. This carbon black graft polymer is provided with sufficient dispersibility even in a low-polar solvent by incorporating the polymer chain of the silicone component in the polymer portion of the carbon black graft polymer.

JP-A-9-272706 discloses a reactive carbon black graft polymer obtained by reacting functional groups on the surface of carbon black with a polymer that contains a segment (A) having a group (1) reactive with functional groups on the surface of carbon black and a segment (B) having a chain structure differing from that of the segment (A), wherein the segments (A) and (B) have a group (2) reactive with a matrix of a desired medium.

DISCLOSURE OF THE INVENTION

However, since an epoxy group is used in the above polymer as a reactive group, a catalyst is used to open the three-membered ring, and remains in the dispersion. Moreover, JP-A-8-337624 and JP-A-9-272706 do not disclose graft carbon black in which isocyanate groups are bonded through a reactive polymer.

The inventors of the present invention conducted studies on surface modification of carbon black that exhibits excellent dispersibility in a non-polar solvent, a low-polar solvent, and a resin. As a result, the inventors found that surface-modified carbon black obtained by reacting the surface of the carbon black with a polymer having a comb-shaped structure with a long side chain exhibits excellent dispersibility in a non-polar solvent, a low-polar solvent, and a resin.

The present invention was conceived based on the above finding. An object of the present invention is to provide carbon black that is surface-modified by causing a functional group on the surface of the carbon black to be bonded to a diol-modified end-containing polymer through a triisocyanate compound and exhibits excellent dispersibility in a non-polar solvent, a low-polar solvent, and a resin.

Dispersible surface-modified carbon black according to the present invention that achieves the above object is characterized in that a surface functional group of the carbon black is bonded to one isocyanate end group of a triisocyanate compound having three isocyanate end groups, and the remaining two isocyanate end groups are respectively bonded to hydroxyl groups of a diol-modified end-containing polymer.

The dispersible surface-modified carbon black according to the present invention is surface-modified by causing the isocyanate end groups of the triisocyanate compound to be bonded to the surface functional group of the carbon black and the hydroxyl groups of the diol-modified end-containing polymer (i.e., the carbon black is surface-modified through the triisocyanate compound). The dispersible surface-modified carbon black thus exhibits excellent dispersibility in a non-polar solvent (e.g., silicone oil) and a low-polar solvent (e.g., an isoparaffin hydrocarbon solvent and a resin medium).

BEST MODE FOR CARRYING OUT THE INVENTION

The carbon black used in the present invention is not particularly limited. For example, furnace black, thermal black, or channel black may be used. It is preferable to use carbon black having a primary particle diameter measured by electron microscopy of 0.01 to 0.3 μm. If the carbon black has a primary particle diameter of less than 0.01 μm, the carbon black tends to aggregate due to a large interparticle cohesive force. If the carbon black has a primary particle diameter of more than 0.3 μm, since the weight of the resulting surface-modified carbon black increases, the carbon black tends to precipitate in a solvent.

The dispersible surface-modified carbon black according to the present invention has a structure in which a surface functional group of the carbon black is bonded via a urethane bond to one isocyanate end group of a triisocyanate compound having three isocyanate end groups, and the remaining two isocyanate end groups are respectively bonded via a urethane bond to hydroxyl groups of a diol-modified end-containing polymer.

Various functional groups are produced on the surface of carbon black through the production process and a post-treatment such as oxidation. The type and the amount of functional group may be controlled by the following methods, for example.

(1) A hydroxyl group, a carboxyl group, and a quinone group are produced by gas-phase oxidation or liquid-phase oxidation, such as exposing carbon black to a gas such as ozone, oxygen, $NO_X$, or $SO_X$, treating carbon black with a low-temperature oxygen plasma, or stirring carbon black in an aqueous solution of an oxidizing agent (e.g., ozone water, hydrogen peroxide aqueous solution, a peroxo diacid or its salt, hypohalite, dichromate, permanganate, or nitric acid).

(2) An amino group is produced by producing a nitro group by oxidization with a nitric acid/sulfuric acid mixture, and reducing the nitro group with a reducing agent such as formaldehyde.

(3) A sulfone group is produced by sulfonation with concentrated sulfuric acid.

(4) An epoxy group is produced by reacting a hydroxyl group or a carboxyl group with a halide having an epoxy group.

The functional group is reacted with a triisocyanate compound having three isocyanate end groups so that the functional group is bonded to one of the three isocyanate end groups. For example, a hydroxyl group is bonded to the isocyanate end group via a urethane bond (OHOCN), and an amino group is bonded to the isocyanate end group via a urea bond (NHCONH). When producing a functional group by oxidation, for example, it is preferable to oxidize the carbon black until the pH reaches 5.0 or less. Carbon black having a pH of 5.0 or less may be directly used without oxidation.

The triisocyanate compound is not particularly limited insofar as the compound has three isocyanate end groups (e.g., isocyanurate structure, biuret structure, or adduct structure). Examples of the triisocyanate compound having an isocyanurate structure include D-177N, D-170N, D-170HN, D-172N (manufactured by Mitsui Takeda Chemicals Inc.), and the like.

The following chemical formula 1 shows a case where a hydroxyl group (i.e., functional group) on the surface of carbon black is reacted with a hexane isocyanate compound having an isocyanurate structure ("D-177N" (triisocyanate hexamethylene isocyanurate) manufactured by Mitsui Takeda Chemicals Inc.) (i.e., triisocyanate compound having three isocyanate end groups) so that one of the isocyanate end groups is bonded to the hydroxyl group on the surface of the carbon black.

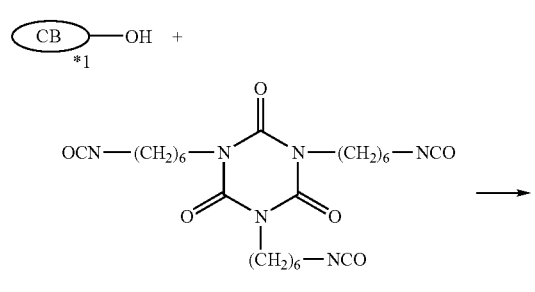
(1)

*1 Carbon black

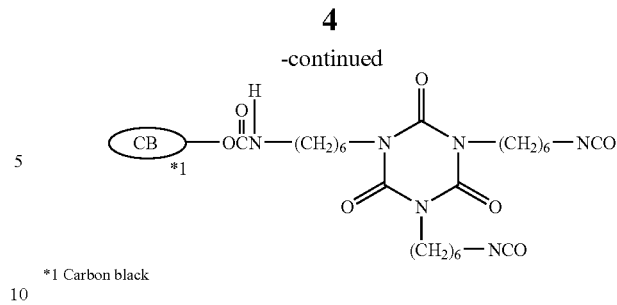

*1 Carbon black

The amount of surface functional groups (particularly hydrogen-containing functional groups such as a hydroxyl group and a carboxyl group) of the carbon black is adjusted by oxidation, if necessary. The carbon black is then added to a non-reactive solvent (e.g., ester or ketone). After the addition of the triisocyanate compound having three isocyanate end groups, the mixture is stirred using a stirrer/defoamer, and sufficiently kneaded using a triple roll mill or the like so that one of the isocyanate end groups of the triisocyanate compound is bonded to the surface functional group of the carbon black.

The dispersible surface-modified carbon black according to the present invention is surface-modified by causing the surface functional group of the carbon black to be bonded to one of the isocyanate end groups of a triisocyanate, and causing the remaining two isocyanate end groups to be respectively bonded to hydroxyl groups of a diol-modified end-containing polymer.

As the diol-modified end-containing polymer, a polymer having a comb-shaped structure with a long side chain is preferably used. The main skeleton of the polymer may be poly(2-ethylhexyl acrylate), poly(octyl acrylate), or the like. The following chemical formula 2 shows a case of using propene-1,2-diol-poly(2-ethylhexylcarbonylethene) sulfide ("UT-1001" manufactured by Soken Chemical & Engineering Co., Ltd.).

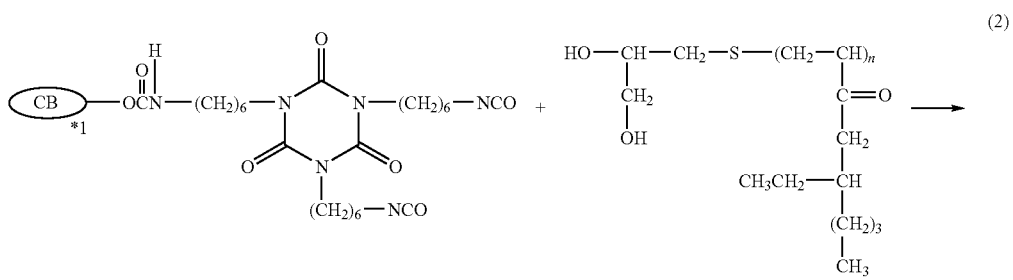
(2)

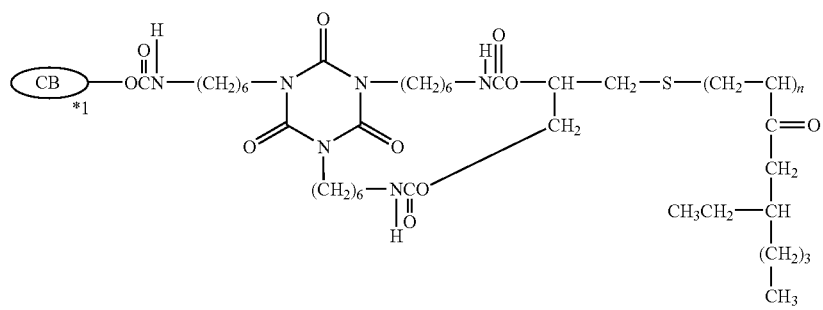

*1 Carbon black

As indicated by the chemical formula 2, the dispersible surface-modified carbon black according to the present invention is surface-modified by causing the surface functional group (hydroxyl group) of the carbon black to be bonded to one of the isocyanate end groups of the triisocyanate compound, and causing the remaining two isocyanate end groups to be respectively bonded to hydroxyl groups of the diol-modified end-containing polymer. Specifically, the carbon black is bonded to the diol-modified end-containing polymer through the triisocyanate compound.

The carbon black that is thus surface-modified exhibits excellent dispersibility in a non-polar solvent or a low-polar solvent (e.g., silicone oil or a hydrocarbon solvent having an iso-structure), and also exhibits excellent dispersibility in a resin.

The dispersible surface-modified carbon black is produced as follows. Specifically, the carbon black is added to a non-reactive solvent (e.g., ester or ketone). After the addition of the triisocyanate compound having three isocyanate end groups, the mixture is stirred using a stirrer/defoamer, and sufficiently kneaded using a triple roll mill or the like so that one of the isocyanate end groups of the triisocyanate compound is bonded to the surface functional group of the carbon black.

After the addition of the diol-modified end-containing polymer, the mixture is stirred using a stirrer/defoamer, and sufficiently kneaded using a triple roll mill or the like. After diluting the mixture with a solvent, the carbon black is dispersed using an ultrasonic homogenizer, a high-pressure homogenizer, a process homogenizer, a ball mill, a bead mill, or the like. The mixture is then heated at 25 to 100° C. for an appropriate period of time so that the unreacted two isocyanate end groups of the triisocyanate compound are bonded via a urethane bond to the hydroxyl groups of the diol-modified end-containing polymer.

In this case, a urethanization reaction easily proceeds by adding a small amount of an addition reaction accelerating catalyst or a dehydration/condensation agent. Examples of the addition reaction accelerating catalyst and the dehydration/condensation agent include dibutyltin dilaurate, concentrated sulfuric acid, N,N'-dicyclohexylcarbodiimide, N,N'-diisopropylcarbodiimide, N-ethyl(3-dimethylaminopropyl)carbodiimide, 1-hydroxybenzotriazole, diethylphosphorocyanidate, 1-ethoxycarbonyl-2-ethoxy-1, 2-dihydroquinone, isobutyl chloroformate, trityl chloride, pivaloyloxymethyl chloride, hafnium chloride, and the like. The same effect is also obtained using a compound or an anhydride having a —N=N— bond.

EXAMPLES

The present invention is further described below by way of examples and comparative examples.

Example 1

Carbon black TB #7550F (manufactured by Tokai Carbon Co., Ltd.) was oxidized in a 2N sodium persulfate aqueous solution, dried, ground, and classified to obtain an oxidized carbon black powder having acidic surface functional groups (hydroxyl group content: 0.74 μeq/m$^2$, carboxyl group content: 4.8 μeq/m$^2$).

35.9 g of an isoparaffin hydrocarbon solvent ("Isopar G" manufactured by ExxonMobil Corporation) was added to 25.0 g of the oxidized carbon black to wet the oxidized carbon black. After the addition of 4.725 g of triisocyanate hexamethylene isocyanurate ("D-177N" manufactured by Mitsui Takeda Chemicals Inc.) (i.e., triisocyanate compound) and 17.5 g of propene-1,2-diol-poly(2-ethylhexylcarbonylethene) sulfide ("UT-1001" manufactured by Soken Chemical & Engineering Co., Ltd., molecular weight: 3500) (i.e., diol-modified end-containing polymer), the components were mixed. The mixture was then stirred for two minutes and defoamed for two minutes using a stirrer/defoamer ("THINKY Mixer" manufactured by THINKY). The mixture was then kneaded for 30 minutes using a triple roll mill ("S-4 ¾×11" manufactured by Inoue Mfg., Inc.). After the addition of the isoparaffin hydrocarbon solvent (Isopar G) in which 0.47225 g of dibutyltin dilaurate (manufactured by Kishida Chemical Co., Ltd.) was dissolved to a concentration of 10 wt %, the mixture was kneaded for 30 minutes using the triple roll mill. In this case, since the isoparaffin hydrocarbon solvent gradually volatilized, the isoparaffin hydrocarbon solvent was appropriately added.

After the addition of the isoparaffin hydrocarbon solvent to the mixture (total amount: 250 g), the carbon black was mechanically dispersed for 10 minutes using an ultrasonic homogenizer ("Ultrasonic Generator" manufactured by Nihonseiki Kaisha Ltd.). The carbon black was then mechanically dispersed at 50 to 150 MPa using a high-pressure homogenizer ("Nanomizer TL-1500" manufactured by Tokai Co. Ltd.).

The resulting dispersion was heated at 70° C. for six hours in a 1-liter separable flask while sufficiently stirring the dispersion.

The isoparaffin hydrocarbon solvent was then added to the dispersion so that the total amount was 250 g to obtain a surface-modified carbon black dispersion 1 in which the carbon black was dispersed in the isoparaffin hydrocarbon solvent (concentration: 10 wt %).

Example 2

Carbon black used in Example 1 was subjected to gas-phase oxidization with ozone to prepare oxidized carbon black having a pH of 2.5 (hydroxyl group content: 1.0 1.0 μeq/m$^2$, carboxyl group content: 3.2 μeq/m$^2$).

A surface-modified carbon black dispersion 2 was produced in the same manner as in Example 1, except for using the resulting oxidized carbon black.

Example 3

A surface-modified carbon black dispersion 3 was produced in the same manner as in Example 1, except for using channel black ("Special Black 4" manufactured by Degussa, pH: 2.3, hydroxyl group content: 0.16 μeq/m$^2$, carboxyl group content 4.2 μeq/m$^2$) as the carbon black.

Example 4

A surface-modified carbon black dispersion 4 was produced in the same manner as in Example 1, except for using propylene glycol methyl ether acetate (PGMEA) instead of the isoparaffin hydrocarbon solvent.

Example 5

A surface-modified carbon black dispersion 5 was produced in the same manner as in Example 1, except for using PGMEA instead of the isoparaffin hydrocarbon solvent, and adding 5.0 g (20 wt % with respect to the carbon black) of an aliphatic ester alcohol ("EHP01" manufactured by Yokkaichi Chemical Co., Ltd.) when heating the dispersion at 70° C. in order to collect and remove unreacted isocyanate groups.

Example 6

A surface-modified carbon black dispersion 6 was produced in the same manner as in Example 1, except for using silicone oil ("KF96L-1cs" manufactured by Shin-Etsu Chemical Co., Ltd.) instead of the isoparaffin hydrocarbon solvent, and 16 g of a diol-modified end-containing silicone polymer ("FM-DA21" manufactured by Chisso Corporation, molecular weight: 5000) as the diol-modified end-containing polymer.

Example 7

A surface-modified carbon black dispersion was produced in the same manner as in Example 1, except for using PGMEA instead of the isoparaffin hydrocarbon solvent. After the addition of 31.3 g of a methacrylic acid resin and 4.7 g of Irgacure 907 (manufactured by Ciba Specialty Chemicals Co., Ltd.) (photoinitiator), the components were mixed to obtain a resin composition 1.

Example 8

A surface-modified carbon black dispersion 7 was produced in the same manner as in Example 1, except for using carbon black ("TB #7550F" manufactured by Tokai Carbon Co., Ltd., pH: 6.0 to 7.0, hydroxyl group content: 0.13 μeq/$m^2$, carboxyl group content: 0.37 μeq/$m^2$) that was not oxidized.

Comparative Example 1

A surface-modified carbon black dispersion 8 was produced in the same manner as in Example 1, except that the triisocyanate compound was not used.

Comparative Example 2

A resin composition 2 was produced in the same manner as in Example 7, except for using carbon black ("TB #7550F" manufactured by Tokai Carbon Co., Ltd.) that was not oxidized.

The mean particle diameter of the carbon black aggregates in each of the dispersions 1 to 8 was measured using a heterodyne laser Doppler grain size analyzer ("9340-UPA150" manufactured by Honeywell). The viscosity of each of the dispersions 1 to 8 was measured using a vibratory viscometer ("VM-100A-L" manufactured by Yamaichi Electronics Ltd.). Table 1 shows a change in measurement results over time. Each of the resin compositions 1 and 2 was applied to hard glass using a bar coater (manufactured by Japan Cedars Service, Rod No. 6) to obtain a film having a thickness of 13.7 μm. The film was then cured. The appearance of the film was evaluated, and the thickness of the film was measured. The degree of blackness of the film was measured using a Macbeth blackness meter ("TR-927" manufactured by Macbeth), and the surface resistivity of the film was measured using a super megohmmeter ("SM-8220" manufactured by DKK-TOA Ltd.). The results are shown in Table 2.

TABLE 1

|  |  | Dispersion 1 | Dispersion 2 | Dispersion 3 | Dispersion 4 | Dispersion 5 | Dispersion 6 | Dispersion 7 | Dispersion 8 |
|---|---|---|---|---|---|---|---|---|---|
| Immediately after preparation | Mean particle diameter (nm) | 146 | 156 | 304 | 201 | 212 | 190 | 490 | 2045 |
|  | Viscosity (cP) | 1.45 | 1.48 | 1.14 | 1.51 | 1.52 | 1.56 | 1.34 | 0.80 |
| After 1 week | Mean particle diameter (nm) | 196 | 260 | 359 | 208 | 215 | 195 | 516 | 2225 |
|  | Viscosity (cP) | 1.19 | 1.21 | 1.08 | 1.40 | 1.41 | 1.37 | 1.29 | 0.90 |
| After 2 weeks | Mean particle diameter (nm) | 161 | 166 | 456 | 220 | 218 | 202 | 513 | 2190 |
|  | Viscosity (cP) | 1.23 | 1.30 | 1.15 | 1.42 | 1.43 | 1.45 | 1.31 | 0.93 |
| After 3 weeks | Mean particle diameter (nm) | 154 | 168 | 434 | 232 | 223 | 208 | 521 | 2188 |
|  | Viscosity (cP) | 1.24 | 1.31 | 1.16 | 1.44 | 1.45 | 1.51 | 1.34 | 0.94 |
| After 4 weeks | Mean particle diameter (nm) | 152 | 170 | 445 | 240 | 230 | 212 | 527 | 2195 |
|  | Viscosity (cP) | 1.22 | 1.31 | 1.14 | 1.46 | 1.46 | 1.50 | 1.37 | 0.92 |

TABLE 2

|  | Resin composition 1 | Resin composition 2 |
|---|---|---|
| Dispersibility | Good | Bad |
| Film thickness (μm) | 13.2 | 13.3 |
| Degree of blackness (O.D.) | 3.6 | 2.1 |
| Surface resistivity (Ω/square) | $4.1 \times 10^8$ | $2.0 \times 10^2$ |

As shown in Tables 1 and 2, the dispersions 1 to 7 exhibited excellent dispersibility as compared with the dispersion 8. The dispersion 3 exhibited inferior dispersibility as compared with the dispersions 1, 2, 4, and 5 since the particle diameter of the carbon black was large. Note that the dispersions 3 and 7 can be used in practice by sufficiently filtering the dispersions. The dispersions 4 and 5 differed in properties to only a small extent. This suggests that dispersibility and storage stability are not significantly improved by terminating unreacted isocyanate groups using an alcohol. The resin composition 1 exhibited excellent dispersibility. On the other hand, the resin composition 2 showed aggregation and precipitation of the carbon black. The resin composition 1 exhibited an excellent degree of blackness and surface resistivity as compared with the resin composition 2.

INDUSTRIAL APPLICABILITY

The dispersible surface-modified carbon black according to the present invention is useful as a black pigment used for a liquid crystal display black matrix or an electronic paper display medium.

The invention claimed is:

1. A dispersible surface-modified carbon black having an excellent dispersibility in a non-polar solvent, a low-polar solvent or a resin, said surface-modified carbon black comprising: a carbon black post-treated to have a surface functional group provided thereon which is bonded to an isocyanate end group of a triisocyanate compound having three isocyanate end groups and a polymer having diol-modified end groups bonded to two isocyanate end groups of the triisocyanate compound, wherein the polymer is propene -1,2-diol-poly(2-ethylhexylcarbonylethene) sulfide.

2. The dispersible surface-modified carbon black of claim 1, wherein the surface function group formed by the post-treatment is a carboxyl group and a hydroxyl group produced by oxidation of the carbon black.

3. The dispersible surface-modified carbon black of claim 1, wherein the carbon black has a primary particle diameter of 0.01 to 0.3 µm.

4. The dispersible surface-modified carbon black of claim 1, wherein the triisocyanate compound is triisocyanate hexamethylene isocyanurate.

5. A liquid crystal display black matrix comprising the surface-modified carbon black of claim 1.

6. An electronic paper display medium comprising the surface-modified carbon black of claim 1.

* * * * *